Dec. 6, 1955 W. T. ELLIS, JR 2,726,288

ELECTROMAGNETIC SOUND RECORDER AND REPRODUCER

Filed Oct. 29, 1954 2 Sheets-Sheet 1

INVENTOR.
WELDON T. ELLIS, JR.
BY
Linton and Linton
ATTORNEYS.

Dec. 6, 1955 W. T. ELLIS, JR 2,726,288

ELECTROMAGNETIC SOUND RECORDER AND REPRODUCER

Filed Oct. 29, 1954 2 Sheets-Sheet 2

INVENTOR.
WELDON T. ELLIS, JR.

BY Linton and Linton

ATTORNEYS.

2,726,288
Patented Dec. 6, 1955

2,726,288

ELECTROMAGNETIC SOUND RECORDER AND REPRODUCER

Weldon T. Ellis, Jr., Arlington, Va.

Application October 29, 1954, Serial No. 465,546
8 Claims. (Cl. 179—100.2)

The present invention relates to electromagnetic sound recording and reproducing devices, and is more particularly directed to a compact and portable device of this nature together with a novel record for use therewith.

The principal object of the invention is to provide a device for this purpose of a relatively small, compact and portable construction employing an endless record capable of recording a large number of sound images thereon.

A further and important object of the invention is to provide electromagnetic sound recorder and reproducers which are self-contained units wherein all necessary elements to the operation thereof are contained in one housing and which employs a record which can be folded and unfolded when separate from the recorder whereby the record can be conveniently stored, mailed or otherwise confined in a small space.

An equally important object of the invention is to provide electromagnetic sound recorder and reproducer which is convenient and simple to operate including volume adjustment, positioning of the pick-up head relative to the record sound tracks, starting, stopping and running of the device, and mounting and demounting of the record, as well as having the elements accessible for quick and easy replacement when required.

Further objects of the invention will be in part obvious and in part pointed out in the following description of the accompanying drawings in which.

Figure 1:
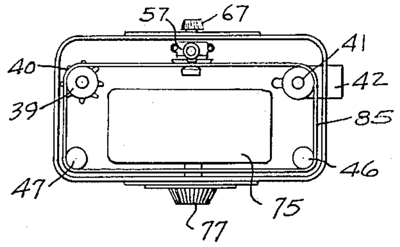
Fig. 1 is a top view of the present recorder and reproducer.
Figure 6:
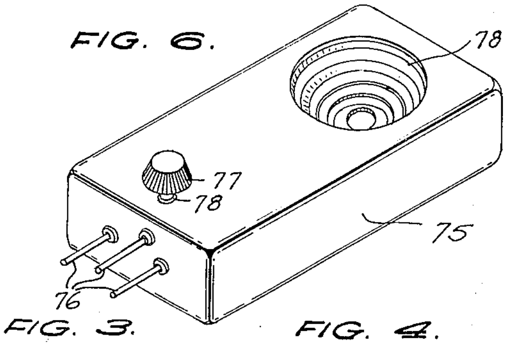
Fig. 6 is a perspective view of the container for the electronic elements of the recorder and reproducer.
Figure 2:
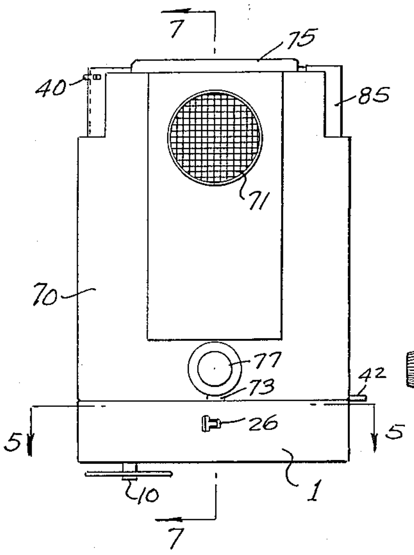
Fig. 2 is a front elevation of the present device.
Figure 3:
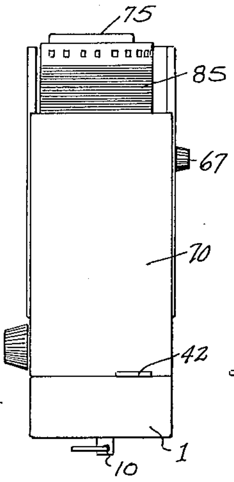
Fig. 3 is a side view taken from the right hand side of Fig. 2.
Figure 4:
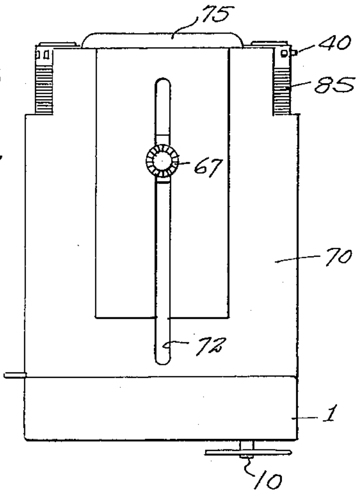
Fig. 4 is a back view of the recorder and reproducer.

Referring now more particularly to the accompanying drawings, wherein like and corresponding parts are designated by similar reference characters, numeral 1 indicates a base container consisting of a flat bottom 2 having substantially perpendicular side walls 3 and 4 which have stepped upper portions 5 and 6 respectively with flat top 7 extending therebetween.

A coil spring 8 connected at one end to posts 9 fixedly mounted on said bottom has its opposite end attached to a shaft 10 which extends exteriorly of bottom 2 with a pivotal handle 11 for manually turning the same. The opposite end of shaft 10 is fixedly connected to a ratchet gear 12 against which bear a pair of pivotally supported pins 13 whose ends engage the teeth of said gear due to the pressure applied by springs 14. Said pins 13 are pivotally mounted upon gear 15 for driving the same through the action of said spring. Gear 16 which is in meshed engagement with gear 15 is fixedly mounted on shaft 17 to which is fixedly connected gear 18 which meshes with gear 19. Said gear 19 is fixedly connected to shaft 20 which also has bevel gear 21 fixedly mounted thereon. A control bar 22 having a finger 23 for engaging the teeth 19 and for stopping the same is pivotally mounted as at 24 to base 2 and extends through front wall slot 26 of said casing 1 presenting end 25 exteriorly thereof whereby the rod may be controlled.

A bevel gear 27 is in meshed engagement with gear 21 and also fixedly connected to the end of screw shaft 28 which shaft is in meshed engagement with gear 29 fixedly mounted upon shaft 30 rotatably supported at its lower end by bottom 2.

Shaft 30 has a socket 31 for receiving a correspondingly shaped end 32 of a screw shaft 33 which extends substantially perpendicular above top 7 and is terminated by a rounded end portion 34.

Figure 5:
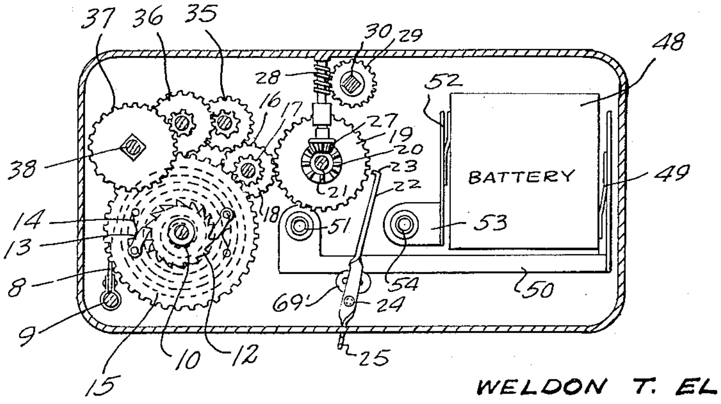
Fig. 5 is an enlarged cross sectional view taken on line 5—5 of Fig. 2.
Figure 7:
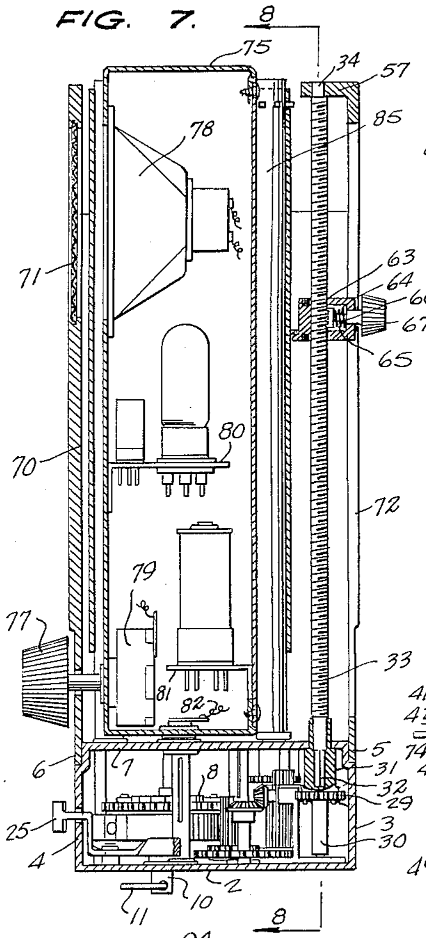
Fig. 7 is an enlarged vertical section taken on line 7—7 of Fig. 2.
Figure 8:
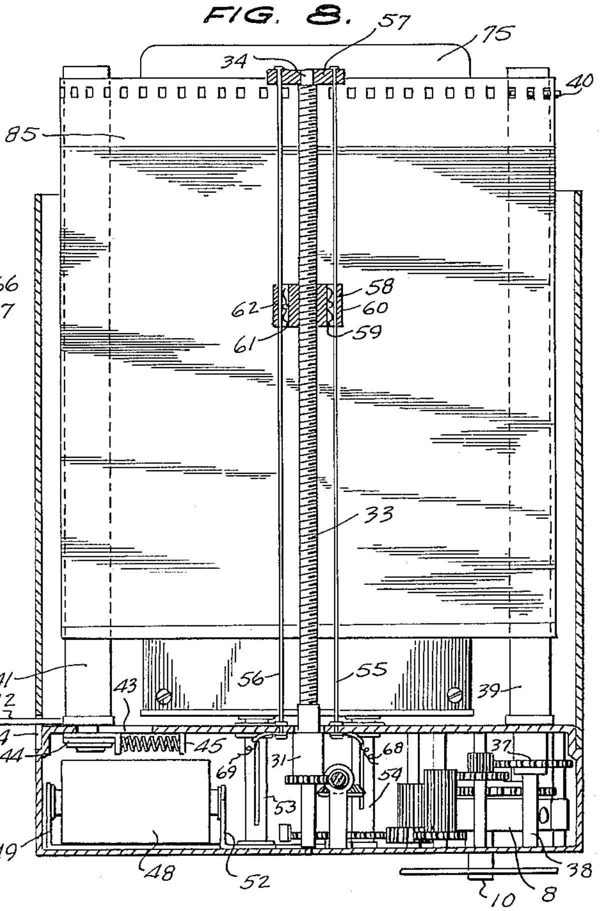
Fig. 8 is a further vertical section taken on line 8—8 of Fig. 7.

Gear 35 is in meshed engagement with gear 18 and also with the gear train represented by the numerals 36 and 37 in Fig. 5 of the drawings. The end gear 37 of said gear train is fixedly mounted on a shaft 38 which extends through top 7 in the form of a cylindrical post 39 having sprocket teeth 40 extending around the upper end periphery thereof. A similar post 41 which extends parallel to post 39 and shaft 33 has a control handle 42 which slides on top 7, while T-shaped end portion 44 of said post slides in slot 43 and upon the interior face of said top 7. A coil spring 45 fixedly mounted upon the interior face of top 7 bears against the head of said post end portion 44 tending to push said post 41 away from post 39. Post 41 is rotatably supported upon its control lever 42, while idler posts 46 and 47 are rotatably mounted upon top 7 and parallel to posts 39 and 41, but spaced therefrom.

A battery 48 is mounted within said casing 1 with one terminal contacting a resilient plate 49 carried by a bar 50 mounted on said bottom 2. A socket 51 is carried by the opposite end of said bar. The other terminal of said battery is in contact with the resilient finger 52 carried by a short bar 53 mounted on said bottom and which likewise has a socket 54.

A pair of guide rods 55 and 56 are fixedly mounted on and extend substantially perpendicular above said top 7 each on an opposite side of screw shaft 33. A bar 57 connects the opposite ends of said rods and also rotatably supports end 34 of said shaft 33. A block 58 having a pair of parallel openings 59 and 61 extending therethrough has rods 55 and 56 extending each through one of said openings while resilient fingers 60 and 62 each press against one of said rods. An electrical pick up head indicated by the numeral 63 is carried by said block 58 while a member 64 having a threaded face normally is in threaded engagement with shaft 33 due to a coil spring 65 bearing against member 64 at one end and against the guide bar 66 of block 58 with handles 67 mounted exteriorly thereof. Wire 68 extends from post 55 to socket 54 while a wire 69 extends from post 56 to a third socket 69'.

A shield 70 has the lower end thereof inserted over the side walls stepped end portions 5 and 6 of casing 1 for being supported thereby and extending substantially vertical thereabove. A meshed opening 71 is provided in the front of said shield, while a vertically extended elongated slot 72 in which is slidably mounted guide bar 66 of block 58 is formed in the back wall of said shield.

A slot 73 is provided in the front lower central portion of said shield, while an opening 74 is provided in the side lower portion of said shield with control bar 42 slidably mounted therethrough.

A housing 75 contains the electronic sound recording and reproducing elements of the present device with three prongs 76 fixedly mounted on and extending from the bottom of said housing 75 for being inserted within sockets 51, 54 and 69′ described hereinabove. A manually operable control 77 extends through said slot 73 into the front of said housing 75. A combination microphone and loud speaker 78 is carried within said housing and positioned for directing the sound to or receiving sound through screen 71. Control 77 is connected to a volume control and record play back switch 79 mounted within said housing, while shelves 80 and 81 contain the additional electronic elements of the sound recording and reproducing members of the present device which are conventional and well known in the art and, therefore, are not specifically described herein. These eletcronic elements are controlled by connection to switch 79 and through electrical connection to prongs 76 for receiving current from battery 48 and recording of or reproducing sound waves through their electrical connection to the pick up head 63. These prongs 76 are appropriately connected to the electronic elements within housing 75 by means of wires 82.

Figures 9, 10:
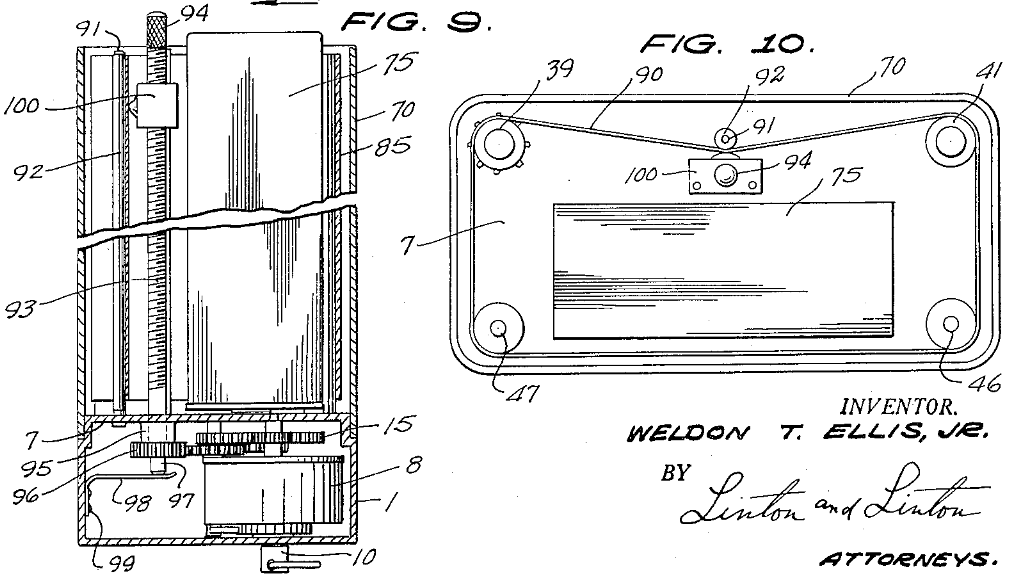
Fig. 9 is a cross sectional view of the present recorder employing a modified form of pick up head drive.
Fig. 10 is a top elevation of the present device modified in accordance with Fig. 9.

The record to be scanned by said pick up head 63 is in the form of an endless belt or sleeve 85 as shown in Fig. 9 of the drawings which has considerable width in relation to its length and also a series of sprocket teeth receiving openings 86 provided around one edge portion thereof. This record consists of a flexible plastic sleeve of a non-magnetizable material with an oxidized coating over either the entire exterior or interior surface. As for example, the non-magnetizable backing may be a resin such as vinylite, celluloid, paper, thin aluminum sleeves or other non-magnetic flexible materials having sufficient strength for being driven repeatedly around posts 39, 41, 46, and 47 of the present device or folded when removed therefrom in order to place the same in the form of a substantially flat sheet.

To operate the present device, the record 85 is mounted over the posts 39, 41, 46 and 47 by moving post 41 against spring 45 until the record is in place and then releasing post 41 for bearing against the record and thereby holding said record taut. Sprocket teeth 40 are inserted in adjacent openings 86. Knob 67 is pulled outwardly permitting block 58 to freely slide on shaft 33 for positioning the pick up head 63 at a desired point laterally of said record whereupon knob 67 is released placing member 64 in threaded engagement with said shaft to be reciprocated thereby upon rotation of said shaft.

Rotation of shaft 10 by manually turning handle 11 tightens spring 8 which is held by the ratchet 12 and 13 while gear 15 is held against rotation by moving handle 25 and inserting finger 23 in gear 19. Conversely, moving finger 23 from gear 19 permits gear 15 to rotate gears 16, 18, 19, 21, 27 and 29 whereby socket 31 rotates screw shaft 33 moving block 58 longitudinally thereof whereby pick up head 63 is caused to scan block 58. Said record 85 at the same time and in coordination with said pick up head moves around said posts due to the rotation of posts 39 and its connection to gear chain 35, 36 and 37 being driven by gear 18.

Electrical current is supplied to the pick up head 63 from battery 48 by means of the electrical connection to posts 55 and 56 and resilient fingers 60 and 62 bearing thereagainst which fingers are electrically connected to said pick up head. One post of battery 49 has socket 51 for receiving one prong 76, while the other post of said battery is connected to socket 54 for receiving a second prong. Thus, electrical current passes into one prong and through wires 82 to the electronic elements within housing 75 and out of a second prong to socket 54, wire 68, rod 55, finger 60 to pick up head 63 while the electrical impulses to and from said pick up head can move through finger 62, rod 56, wire 69, socket 69′ to the third of said prongs 76 to proper connection with the electronic elements within said housing. Knob 77 is manually controlled for determining the volume and whether sound recording or reproducing is to be effected. It is to be appreciated that the pick up head scans record 85 and magnetizes the coating thereon in a conventional manner for producing lines on said coating in accordance with the sound impulses received and conversely, traverses said record for scanning the same and receiving impulses therefrom when reproducing the sound.

Shield 70 can at any time be easily and quickly removed as can shaft 33 and similarly housing 75 can be disconnected by removing the prongs 76 from their respective sockets. Similarly, the record can be removed by pushing lever 42 inwardly relieving the tension on said record whereupon it can be quickly and easily slid from the posts and can be folded in such a manner as to permit its being mailed as a letter, greeting card or advertisement or can be stored in a relatively small area, while being readily available for reuse.

The pick up head 63 while shown scanning the exterior of the record can equally as well be positioned for scanning the interior surface thereof.

In Figs. 9 and 10 there is shown a modified form of pick up head drive for sound recorders and reproducers. The machine is essentially the same as the device hereinbefore described, excepting that it employs an endless sound record having an inner surface coated upon the interior face thereof. A shaft 91 is fixedly mounted upon the top 7 and extends substantially perpendicular therefrom, while a roller 92 is freely and rotatably mounted upon said shaft.

A screw shaft 93 is provided in lieu of the screw shaft 33 of the previously described apparatus and has a knurled head 94 for the manual rotation thereof when required. A tubular bearing 95 extends downwardly from top 7 and has said screw shaft 93 rotatable and longitudinally slidable therethrough. A gear 96 is fixedly mounted upon the lower end of said screw shaft, while an end portion 97 of said shaft extends beneath, resting upon a resilient L-shaped arm 98 fastened by rivets or the like 99 to the side wall 3 of container 1.

Shaft 91 is positioned for causing roller 92 to direct the record 90 towards shaft 93 as best shown in Fig. 10. Said screw shaft carries an electrical pick up head 100 similar to the head 58 of the previously described apparatus. This head 100 is in meshed engagement with shaft 93 for moving therealong as the shaft is rotated and for this purpose gear 96 is held in meshed engagement with the chain of gears 15 to 18 and 35 to 38 driven by spring 8 as the resilient arm 98 tends to push said shaft upwardly with gear 96 resting against bearing 95. At such times, as it is desirable that the pick up head 100 have its position changes laterally of record 90, the operator can press down on head 94 of shaft 93 so that arm 98 is caused to bend and gear 96 is out of engagement with said chain of gears. Then by turning shaft 93, pick up head 100 can be positioned as required and upon releasing head 94, arm 98 will return gear 96 to its operative engagement with said chain of gears.

It is to be appreciated that record 90 can be coated on two or both sides for recording and reproducing purposes and this modified form of drive can be equally as well employed on the exterior of said record merely by reversing the position of shafts 91 and 93. Further, the apparatus is capable of considerable modification and such changes thereto as come within the scope of the appended claims are deemed to be a part of the present invention.

What I claim is:

1. An electromagnetic sound recorder and reproducer comprising a base housing, a plurality of endless sound record supporting shafts mounted on said housing, a screw shaft rotatably mounted on said housing substantially parallel with said plurality of shafts, means within said housing for rotating at least one of said record supporting shafts and said screw shaft in unison, means for being reciprocated longitudinally of said screw shaft upon its rotation, a pick-up head carried by said reciprocated means and positioned for scanning said record upon operation of said rotating means, a source of electrical current mounted in said housing, a container detachably mounted on said housing, electrical sound pick-up and reproducing means mounted within said container and means electrically connecting said sound pick-up and reproducing means to said source of current and said pick-up means when said container is mounted on said housing.

2. An electromagnetic sound recorder and reproducer as claimed in claim 1 wherein said connecting means includes a plurality of prongs extending from said container and in electrical connection with said sound pick-up and reproducing means and sockets mounted in said housing for receiving said prongs being in electrical connection with said source of electrical current and said pick-up head.

3. An electromagnetic sound recorder and reproducer as claimed in claim 1, wherein said rotating means includes a chain of interconnected gears connected to the lower end of at least one of said record supporting shafts and said screw shaft for rotating the same at desired relative speeds, a spring motor for driving said chain of gears and a control lever for stopping and starting said gears extending exteriorly of said housing.

4. An electromagnetic sound recorder and reproducer as claimed in claim 1 wherein said screw shaft is rotatably supported at one end in said housing and extends exteriorly therefrom, a plurality of guide rods is mounted on said housing extending substantially parallel to said screw shaft, a block having guide openings is slidably mounted on said rods, said pick-up head is carried by said block and is in electrical connection with said rods, a plate having a threaded surface is resiliently mounted on said block for being at times in threaded engagement with said screw shaft and being moved thereby and means electrically connecting said rods to said source of electrical current and said sound pick-up and reproducing means.

5. An electromagnetic sound recorder and reproducer as claimed in claim 1, wherein said record supporting shafts are spaced apart, but extend substantially perpendicular from said housing, one of said shafts being slidably mounted on said housing and resilient means tending to hold said shaft against sliding for tensioning the record extending therearound.

6. An electromagnetic sound recorder and reproducer as claimed in claim 1, wherein said screw shaft is also slidably mounted on said housing for longitudinal movement and resilient means tends to position said shaft in engagement with said driving means.

7. An electromagnetic sound recorder and reproducer as claimed in claim 1, wherein said screw shaft is also slidably mounted on said housing for longitudinal movement, a gear is fixedly carried by said shaft, a chain of gears is provided for being driven by said rotating means and resilient means tending to position said shaft longitudinally with said gear normally in meshed engagement with said chain of gears.

8. An electromagnetic sound recorder and reproducer as claimed in claim 1 wherein said screw shaft is mounted for longitudinal movement laterally of one side of said endless sound record, a free roller is also mounted on said housing for guiding said record towards said pick up head on said shaft, means is provided for operatively engaging said shaft with said rotating means while being capable of disengaging said shaft from said rotating means upon longitudinal movement of said shaft and resilient means tends to position said shaft in its operative engagement with said rotating means.

References Cited in the file of this patent

UNITED STATES PATENTS

| | | |
|---|---|---|
| 2,188,650 | Clark | Jan. 30, 1940 |
| 2,535,480 | Begun | Dec. 26, 1950 |
| 2,702,710 | Conrad | Feb. 22, 1955 |